United States Patent
Schropp

Patent Number: 5,236,179
Date of Patent: Aug. 17, 1993

[54] GARDEN TRIM FENCE

[76] Inventor: Carl Schropp, 257 Normandy Avenue, Waterloo, Ontario, Canada, N2K 1X6

[21] Appl. No.: 944,111
[22] Filed: Sep. 11, 1992
[51] Int. Cl.⁵ .......................................... E04H 17/00
[52] U.S. Cl. .................................... 256/19; 256/29; 47/33
[58] Field of Search ............... 47/33; 52/102; 403/29, 403/19; 256/19, 29

[56] References Cited

U.S. PATENT DOCUMENTS

| | | | |
|---|---|---|---|
| 352,146 | 11/1886 | Oungst. | |
| 433,219 | 7/1890 | Schwartz | 52/102 |
| 557,030 | 3/1896 | Schaefer. | |
| 1,591,509 | 6/1956 | Brookman. | |
| 2,550,883 | 5/1951 | St. Vincent | 20/4 |
| 2,865,136 | 12/1958 | Scott et al. | 47/33 |
| 3,484,989 | 12/1969 | Lazinsky | 47/33 |
| 3,495,352 | 2/1970 | Sbare | 47/33 |
| 3,559,338 | 2/1971 | Klingberg | 47/33 |
| 3,788,001 | 1/1974 | Balfanz, Jr. | 47/33 |
| 4,167,079 | 9/1979 | Reiter | 47/33 |
| 4,543,745 | 10/1985 | Beck | 47/33 |
| 4,566,219 | 1/1986 | Firth | 43/107 |
| 4,747,231 | 5/1988 | LeMay et al. | 47/33 |

FOREIGN PATENT DOCUMENTS

| | | | |
|---|---|---|---|
| 564517 | 8/1987 | Australia. | |
| 587195 | 10/1933 | Fed. Rep. of Germany. | |
| 2372292 | 7/1978 | France | 52/102 |
| 2519367 | 7/1983 | France | 252/19 |
| 2565063 | 12/1985 | France | 47/33 |

Primary Examiner—Randolph A. Reese
Assistant Examiner—Anthony Knight
Attorney, Agent, or Firm—Sim & McBurney

[57] ABSTRACT

A garden trim fence adapted for installation in a channel dug into the ground, the garden trim fence comprising a wire, an anchor block, a plurality of adjacent vertically arranged regular blocks, each of the regular blocks having a hole extending horizontally from one side to an opposite side thereof for passing the wire therethrough so as to support the blocks, the hole being adapted to lie below ground level when installed, and the anchor block including means for securing a distal end of the wire.

26 Claims, 3 Drawing Sheets

GARDEN TRIM FENCE

FIELD OF THE INVENTION

This invention relates in general to fencing and more particularly to a multi-link garden trim fence.

BACKGROUND OF THE INVENTION

Garden trim fencing has been used in the past for aesthetic reasons, to provide a decorative trim around a garden, walkway or the like. Fencing of this variety has also been used to prevent erosion of flower beds. Specifically, the fencing operates to prevent washing away of soil through rain or ordinary watering of the garden.

One such prior art fencing comprises a plurality of concrete casting blocks which are deposited in a channel which is dug at the edge of a garden or flower bed. One disadvantage of such prior art flower trim fences is that each is independent of the adjacent blocks, and the blocks are not held together. In addition, it is often difficult to place the concrete blocks so as to follow the contour of a garden or flower bed or to achieve a smooth and even line or curve. For example, it is extremely difficult to create an even circular trim using such prior art concrete block fencing.

SUMMARY OF THE INVENTION

According to the present invention, a multi-link garden trim fence is provided in which all components or blocks of the fence are held tightly together and in place. The trim fence of the present invention may be used to create lines or curves such as circles, as well as traditional right angle corners, etc.

In accordance with a general aspect of the present invention, there is provided a garden trim fence adapted for installation in a channel dug into the ground, said garden trim fence comprising a wire, an anchor block, a plurality of adjacent vertically arranged regular blocks, each of said regular blocks having a hole extending horizontally from one side to an opposite side thereof for passing said wire therethrough so as to support said blocks, said hole being adapted to lie below ground level when installed, and said anchor block including means for securing a distal end of said wire.

BRIEF INTRODUCTION TO THE DRAWINGS

DETAILED DESCRIPTION OF THE PREFERRED EMBODIMENTS

Figure 1:
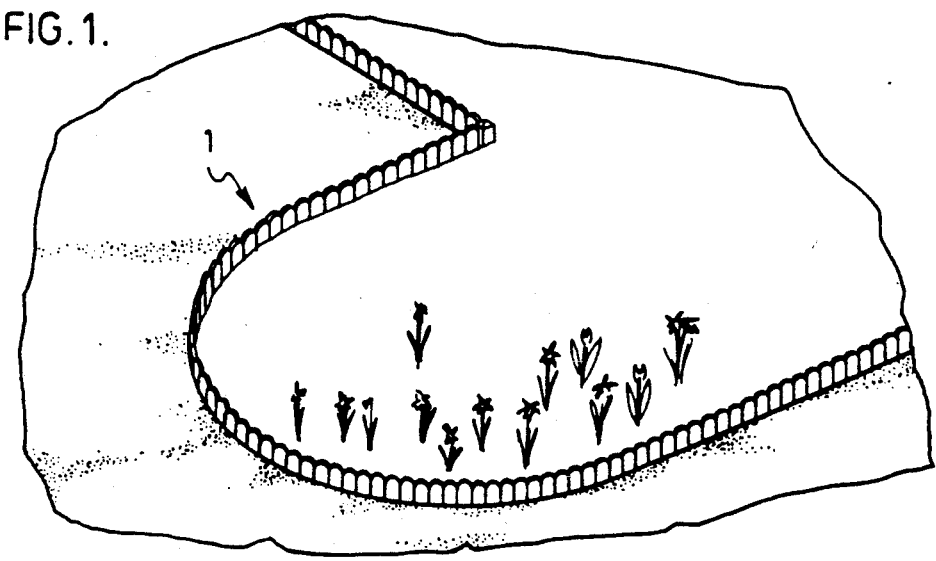
FIG. 1 is a perspective view of the garden trim fence of the present invention in assembled form.

Turning to FIG. 1, a garden trim fence 1 is shown according to the present invention, defining the perimeter of a garden. The garden trim fence; includes straight section of fence, right-angle corners as well as curved or arcuate fence sections. In contrast with the known prior art, the garden trim fence 1 of the present invention may be configured to follow the contour of the garden or flower bed so as to achieve a smooth and even line or curve.

Figure 2:
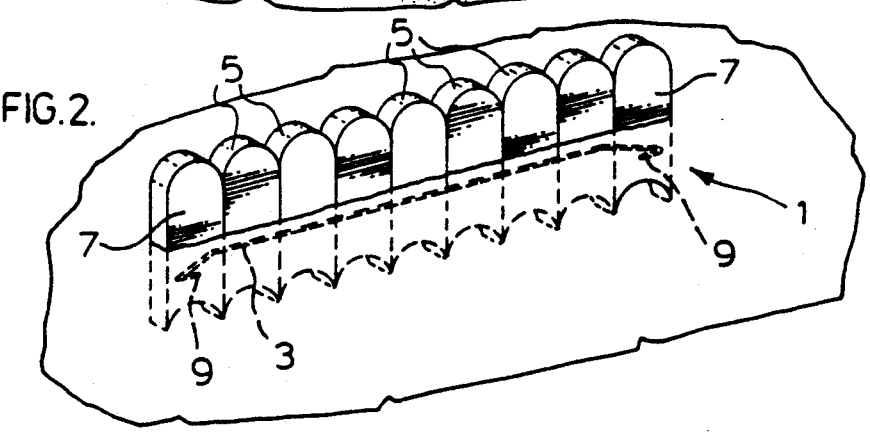
FIG. 2 is a perspective view of a portion of the garden trim fence of the present invention comprising a plurality of interconnected regular blocks intermediate a pair of anchor blocks.

With reference to FIG. 2, a further configuration of the garden trim fence of the present invention is shown, including subterranean interconnection of the blocks via a wire 3. In particular, the embodiment of the fence shown in FIG. 2 comprises a plurality of regular blocks 5 terminated at each end via a pair of anchor blocks 7. The centre blocks 5 and anchor blocks 7 each contain a hole or cylindrical bore through which the wire 3 passes, as described in greater detail below. The ends 9 of the wire 3 protrude from the anchor blocks 7 and are bent back approximately 160° so as to hold the blocks 5 and 7 firmly in place. To install the fence, the channel dug at the edge of the garden or flower bed approximately 4" deep and 3" wide (10 cm deep and 8.5 cm wide). The assembled fence is aligned and placed upright into the channel and soil is back filled and tapped lightly into place. When installed, approximately 4" to 5" (10 cm to 12 cm) of the fence appears above the ground. Furthermore, when installed, the wire 3 which holds the blocks together is hidden from the front and back and extends out of the fence only at the anchor blocks 7 where the short end 9 of the wire (approximately 1" in length) projects. In any event, the wire is beneath ground level.

Figure 3:
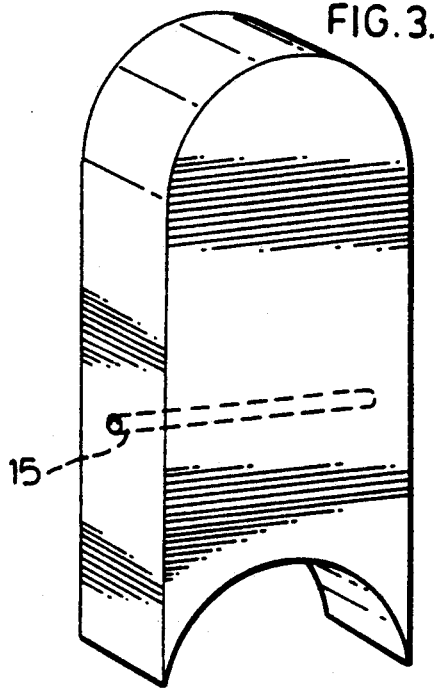
FIG. 3 is a perspective view of a regular block in accordance with the preferred embodiment.
Figure 4:
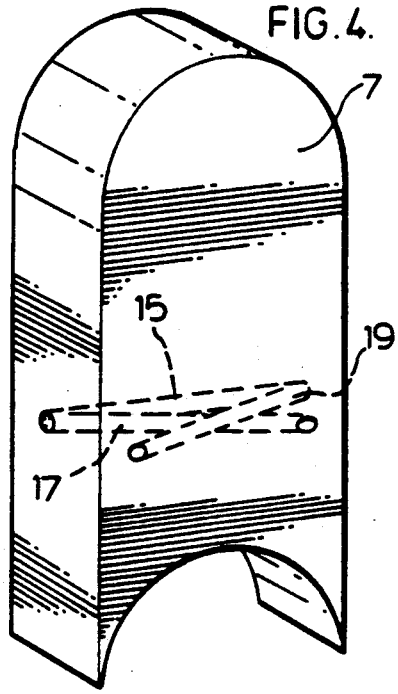
FIG. 4 is a perspective view of an anchor block according to the preferred embodiment.
Figure 5:
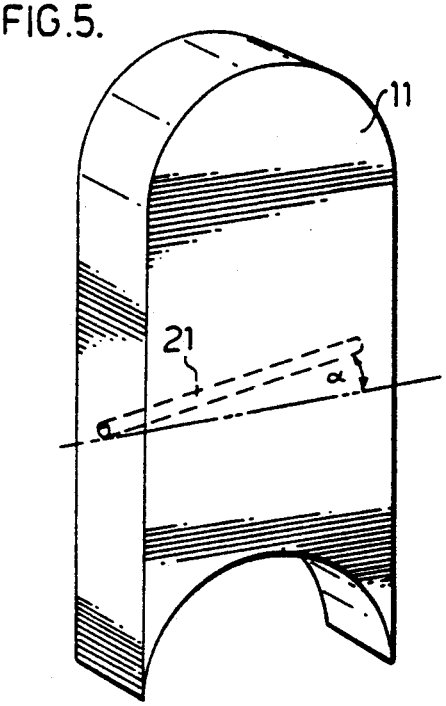
FIG. 5 is a perspective view of a riser block according to the preferred embodiment.
Figure 6:
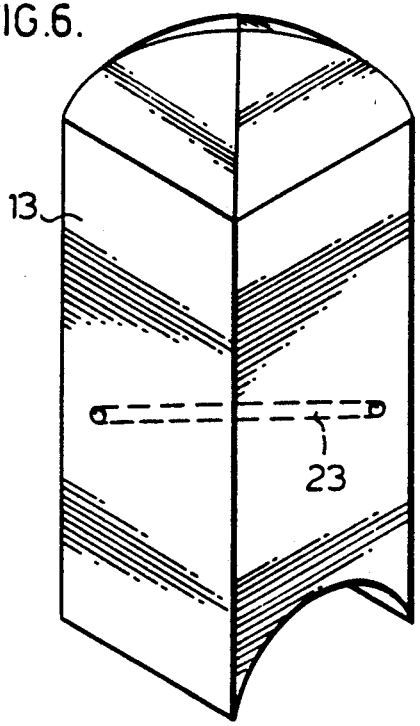
FIG. 6 is a perspective view of a corner block according to the preferred embodiment.

With reference to FIGS. 3 to 6, each of the regular block 5, anchor block 7, riser block 11 and corner block 13 are shown. The blocks 4, 7, 11 and 13 are preferably fabricated from pressure treated wood or cedar, each cut to a length of between 21.3 cm to 34.9 cm with approximately 5 cm radius (convex) top and 5 cm radius (concave) bottom. The regular block 5, anchor block 7 and riser block 11 are preferably cut from 2" × 4" pressure treated wood or 2" × 4" cedar (FIGS. 3-5). The corner block 13 is preferably cut from 4" × 4" pressure treated wood or 4" × 4" cedar (FIG. 6).

Figure 8:
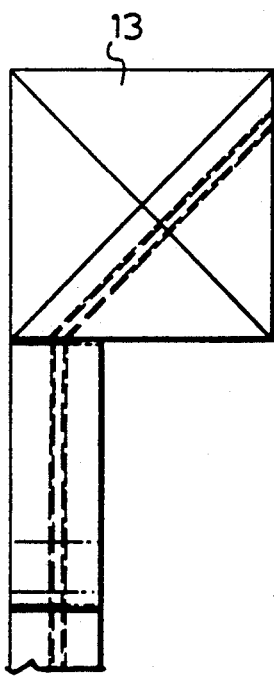
FIG. 8 is a plan view of a plurality of regular blocks connected to a corner block.

Each of the blocks 5, 7, 11 and 13 has one or more holes or cylindrical bores extending therethrough, for extending the plastic coated fence wire 3. Specifically, the regular block 5 (FIG. 3) has a hole 15 extending horizontally from one side to an opposite thereof. In addition to the hole 15, the anchor block 7 includes to additional holes 17 and 19 for securing the wire end 9 as shown in FIG. 2. The riser block 11 incorporates a cylindrical bore or hole 21 extending from one side thereof to the opposite side at an angle α of from 15° to 45° (FIG. 5). Finally, the corner block 13 incorporates a hole or cylindrical bore 23 which is disposed on a 45° diagonal when viewed from the top (FIG. 8). Each of the holes 15-23 are preferably of 3/16" (4.8 mm) diameter.

Figure 7:
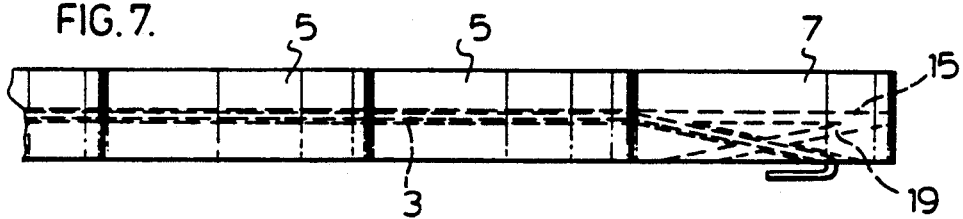
FIG. 7 is a plan view of a plurality of regular blocks connected to an anchor block.
Figure 9:
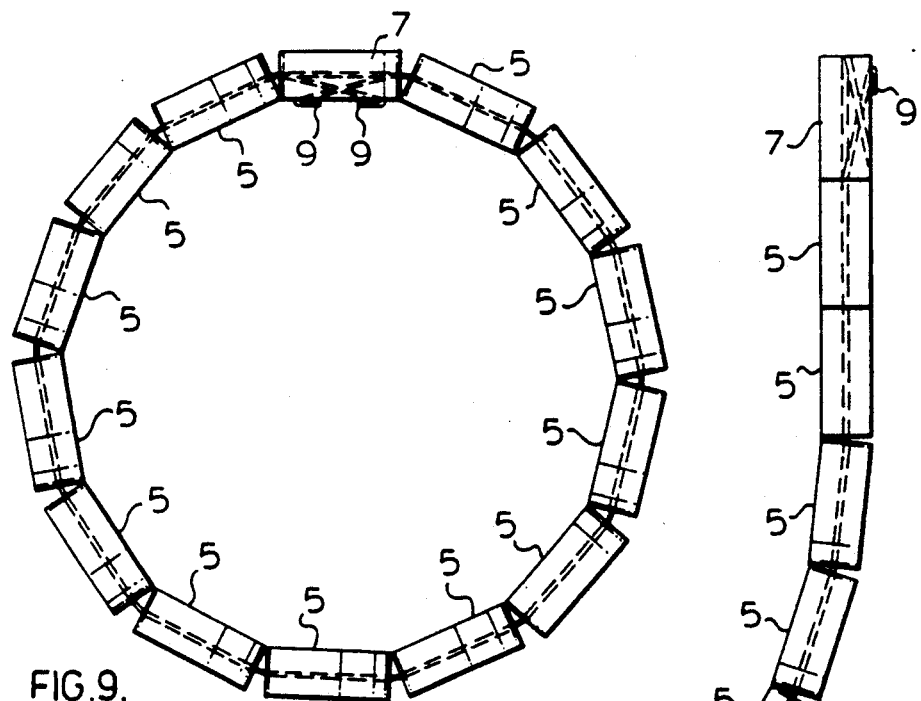
FIG. 9 is a plan view of an assembled garden trim fence configured to form a circle.
Figure 10:
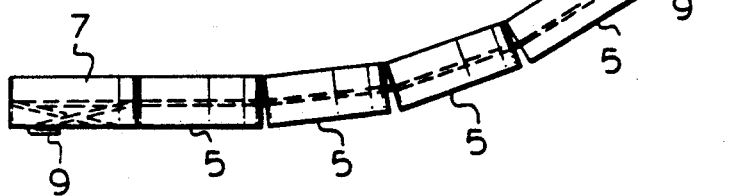
FIG. 10 is a plan view of an assembled garden trim fence showing curved and straight sections.
Figure 11:
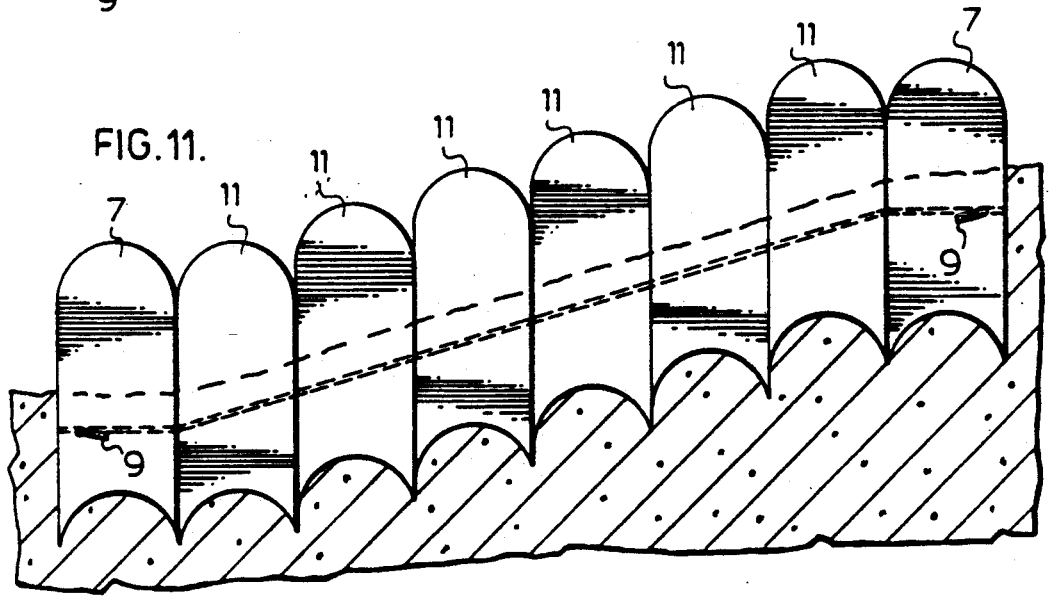
FIG. 11 is a side view of a fence configured with riser blocks terminate at either end by a pair of anchor blocks.

In order to assemble the various blocks into a fence, the fencing wire 3 is measured to the desired length of the fence and cut 6" (approximately 15 cm) longer than the desired measured length. The wire 3 used to secure the blocks together is preferably plastic coated fence wire of approximately 5/32" (4 mm) diameter. With reference to FIG. 7, the wire 3 is first fed through the hole 17 (or 19) of anchor block 7, and the end 9 thereof is bent back 160°. The wire 3 is then fed through the holes 15 of regular blocks 5, and any combination of riser blocks 11, corner blocks 13 via respective holes 21 and 23, to form the desired fence configuration, ending with another anchor block 7 in which the wire 3 is passed and the end 9 of which is bent back at 160°. Examples of various configurations of fence are shown in FIGS. 9–11. For the circular configuration of FIG. 9, a single anchor block is used to connect opposite ends 9 of the wire 3 which passes through a plurality of circularly arranged regular blocks 9.

FIG. 10 shows a fence constructed of two lengths of wire 3 extending through two sections of regular blocks 5, terminated at opposite ends via a pair of anchor blocks 7 and interconnected via an intermediate anchor block.

With reference to FIG. 11, by using riser blocks 11, the garden trim fence of the present invention can be assembled to fit sloping surfaces.

The regular block 5 anchor block 7, riser block 11 and corner block 13 of the present invention may be mass produced via a machine comprising an apparatus for planting and advancing either 2" × 4" or 4" × 4" pieces of wood through a series cutting and drilling stations. Specifically, a jigsaw-type blade may be used to cut the top and bottom curves of the blocks, and hydraulically or air operated drills may be used to create the holes 15, 17, 19, 21 and 23 oriented at various predetermined angles as required.

Other embodiments or variations of the invention are possible. For example, the blocks 5, 7, 11 and 13 may be fabricated from injection moulded plastic or other substance and suitably coloured. All such variations and modifications are believed to be within the sphere and scope of the invention as defined by the claims appended hereto.

I claim:

1. A garden trim fence adapted for installation in a channel dug into the ground, said garden trim fence comprising a wire, an anchor block, a plurality of adjacent vertically arranged regular blocks, each of said regular blocks having a hole extending horizontally from one side to an opposite side thereof for passing said wire therethrough so as to support said blocks, said hole being adapted to lie below ground level when installed, and said anchor block including means for securing a distal end of said wire, further comprising a riser block adjacent said regular blocks, said riser block having a hole extending therethrough from one side to an opposite side at a predetermined angle from horizontal and adapted to lie below ground level when installed.

2. The garden trim fence of claim 1 wherein said predetermined angle is in the range of from 15° to 45°.

3. The garden trim fence of claim 1, wherein each of said anchor block, said riser block and said regular blocks is characterized by a rectangular shape in horizontal cross-section.

4. The garden trim fence of claim 3, wherein said rectangular shape is characterized by front and rear portions which are each twice as wide as the sides thereof.

5. The garden trim fence of claim 4, wherein said front and rear portions are each approximately 4" and said sides are each approximately 2".

6. The garden trim fence of claim 1, wherein each said hole is in the form of a cylindrical bore having diameter of approximately 3/16" (4.8 mm).

7. The garden trim fence of claim 1, wherein each of said anchor block, riser block, and regular blocks is fabricated from pressure treated wood.

8. The garden trim fence of claim 1, wherein each of said anchor block, riser block, and regular blocks is fabricated from cedar.

9. The garden trim fence of claim 1, wherein each of said anchor block, riser block, and regular blocks is characterized by an overall length in the range of from 8 ⅜" to 13 ¾" (21.3 cm to 34.9 cm).

10. A garden trim fence adapted for installation in a channel dug into the ground, said garden trim fence comprising a wire, an anchor block, a plurality of adjacent vertically arranged regular blocks, each of said regular blocks having a hole extending horizontally from one side to an opposite side thereof for passing said wire therethrough so as to support said blocks, said hole being adapted to lie below ground level when installed, and said anchor block including means for securing a distal end of said wire, further comprising a corner block adjacent said regular blocks, said corner block having a hole extending therethrough horizontally from one side to an adjacent side and adapted side and adapted to lie below ground level when installed, wherein said hole through said corner block is disposed at an angle of 45° to each of said one side and said adjacent side.

11. The garden trim fence of claim 10, wherein said corner block is characterized by a square shape in horizontal cross-section.

12. The garden trim fence of claim 4, wherein said square shape is approximately 4" by 4".

13. The garden trim fence of claim 10, wherein each said hole is in the form of a cylindrical bore having diameter of approximately 3/16" (4.8 mm).

14. The garden trim fence of claim 10, wherein each of said anchor block, corner block and regular blocks is fabricated from pressure treated wood.

15. The garden trim fence of claim 10, wherein each of said anchor block, corner block and regular blocks is fabricated from cedar.

16. The garden trim fence of claim 10, wherein each of said anchor block, corner block and regular blocks is characterized by an overall length in the range of from 8 ⅜" to 13 ¾" (21.3 cm to 34.9 cm).

17. A garden trim fence adapted for installation in a channel dug into the ground, said garden trim fence comprising a wire, an anchor block, a plurality of adjacent vertically arranged regular blocks, each of said regular blocks having a hole extending horizontally from one side to an opposite side thereof for passing said wire therethrough so as to support said blocks, said hole being adapted to lie below ground level when installed, and said anchor block including means for securing a distal end of said wire, wherein said wire is in the form of plastic coated fence wire of approximately 5/32" (4 mm) diameter.

18. The garden trim fence of claim 17, wherein each said hole is in the form of a cylindrical bore having diameter of approximately 3/16" (4.8 mm).

19. The garden trim fence of claim 17, wherein each of said anchor block and regular blocks is fabricated from pressure treated wood.

20. The garden trim fence of claim 17, wherein each of said anchor block and regular blocks is fabricated from cedar.

21. The garden trim fence of claim 17, wherein each of said anchor block and regular blocks is characterized by an overall length in the range of from 8 ⅜" to 13 ¾" (21.3 cm to 34.9 cm).

22. A garden trim fence adapted for installation in a channel dug into the ground, said garden trim fence comprising a wire, an anchor block, a plurality of adjacent vertically arranged regular blocks, each of said regular blocks having a hole extending horizontally from one side to an opposite side thereof for passing said wire therethrough so as to support said blocks, said hole being adapted to lie below ground level when installed, and said anchor block including means for securing a distal end of said wire, wherein each of said anchor block and regular blocks is characterized by a 2" (5 cm) radius convex top surface and a 2" (5 cm) concave bottom surface.

23. The garden trim fence of claim 22, wherein each said hole is in the form of a cylindrical bore having diameter of approximately 3/16" (4.8 mm).

24. The garden trim fence of claim 22, wherein each of said anchor block and regular blocks is fabricated from pressure treated wood.

25. The garden trim fence of claim 22, wherein each of said anchor block and regular blocks is fabricated from cedar.

26. The garden trim fence of claim 22, wherein each of said anchor block and regular blocks is characterized by an overall length in the range of from 8 ⅜" to 13 ¾" (21.3 cm to 34.9 cm).

* * * * *